United States Patent
Dunbar

[15] 3,706,507
[45] Dec. 19, 1972

[54] TIDE-ACTUATED MACHINE

[72] Inventor: Charles C. Dunbar, 62 Bowdoin Street, Portland, Maine 04102

[22] Filed: Aug. 11, 1971

[21] Appl. No.: 170,756

[52] U.S. Cl. ............................................ 415/7, 415/5
[51] Int. Cl. ............................................... F01d 25/28
[58] Field of Search ........................ 415/5, 7; 417/61

[56] References Cited

UNITED STATES PATENTS

| | | | |
|---|---|---|---|
| 1,654,959 | 1/1938 | Clayton | 415/7 |
| 1,996,886 | 4/1935 | Schwarzmayr | 415/5 |
| 3,644,052 | 2/1972 | Lininger | 415/7 |

Primary Examiner—C. J. Husar
Attorney—Kenyon & Kenyon Reilly Carr & Chapin

[57] ABSTRACT

A machine is disclosed for deriving power from the vertical tidal movement of a floating body whereby power continues to be supplied to a rotatable power shaft at high tide and at low tide and adjacent periods when tidal movement is relatively slight by power supplied by a weight which is controlled so as to descend independently of tidal movement while being lifted by float means during rising tidal movement. A clock mechanism controls weight holding and releasing means in timed relation to tidal movements and means is provided for setting said clock mechanism so as to release the weight prior to high tide and prior to low tide in predetermined timed relationship.

6 Claims, 8 Drawing Figures

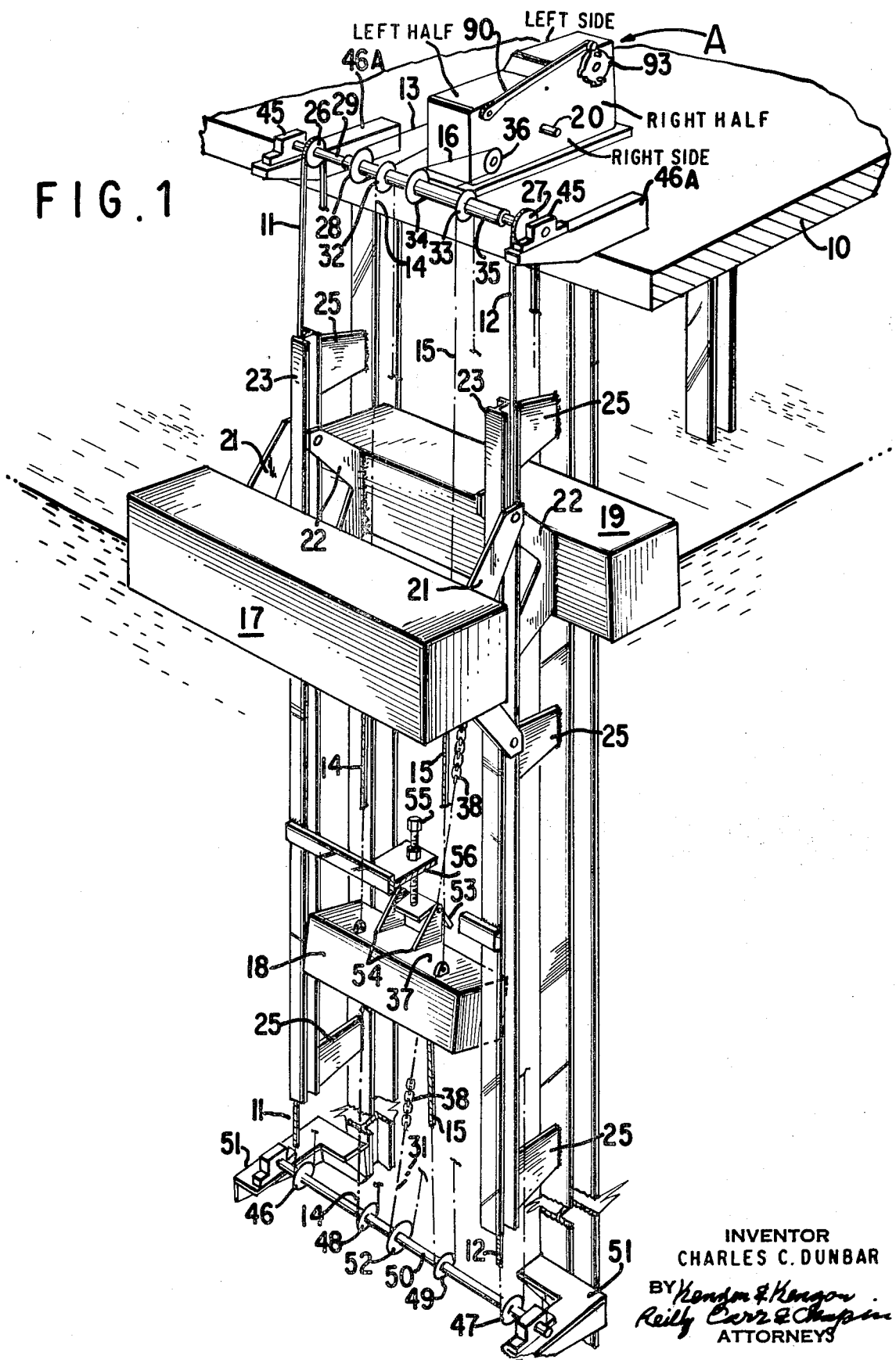

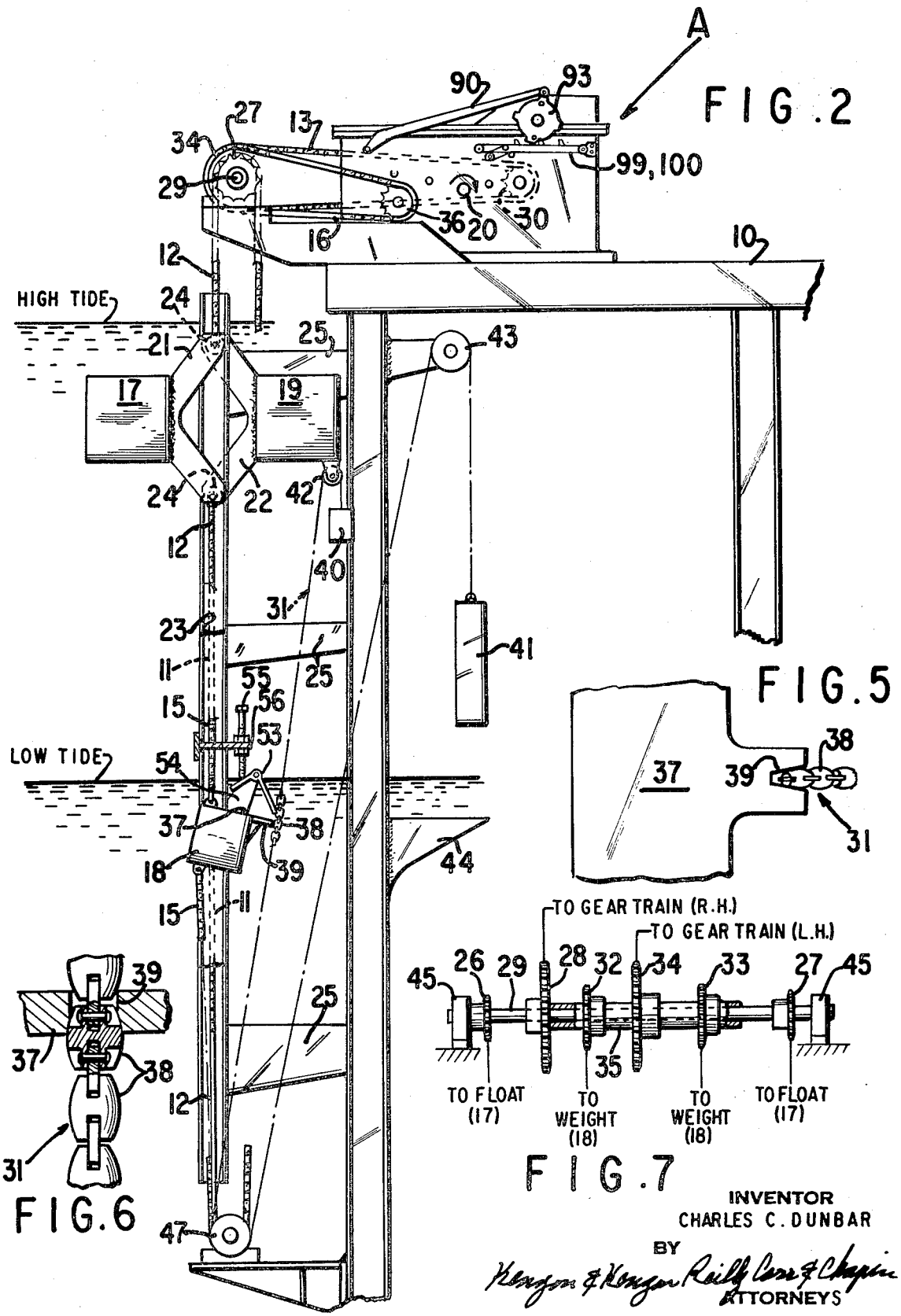

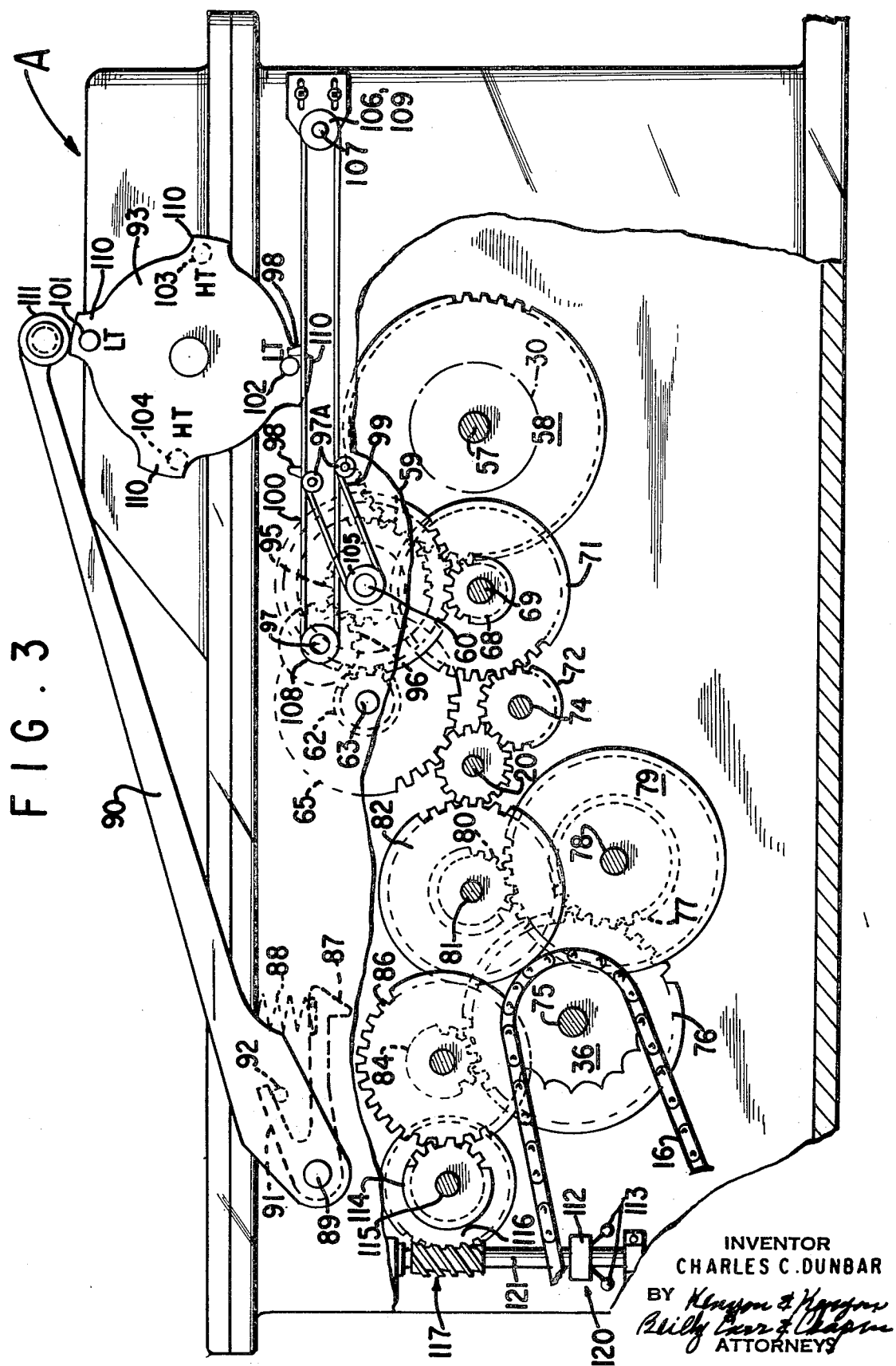

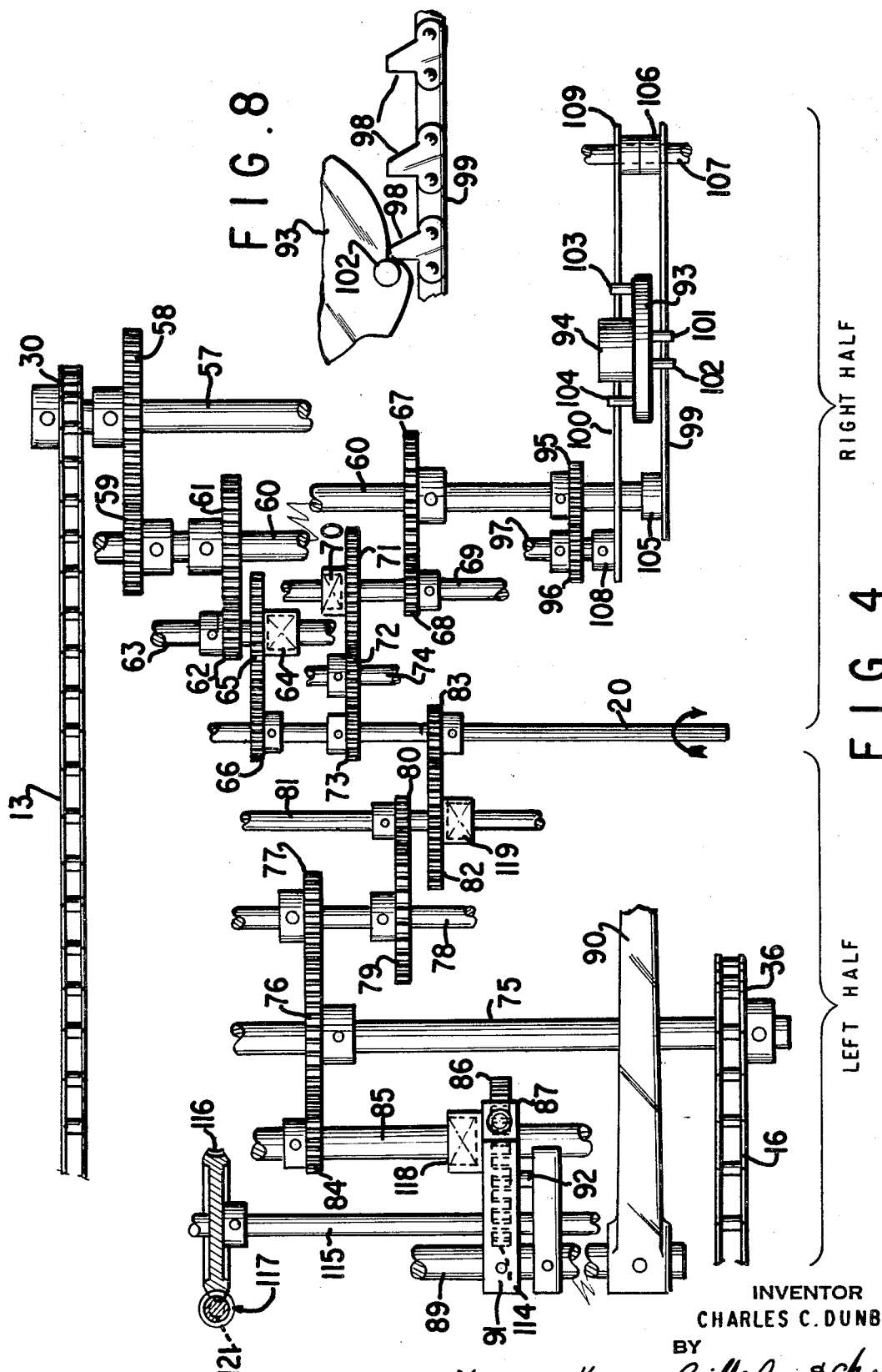

3,706,507

TIDE-ACTUATED MACHINE

FIELD OF THE INVENTION

This invention relates to the production of mechanical power in useful form from the tidal movements of a floating body.

BACKGROUND OF THE INVENTION

For many years thought has been given to the possibility of recovering useful power from the alternate ascent and descent of a floating body responsive to rising and ebbing tidal movements. While the foot-pounds of energy derivable from a massive floating body may be very large, so far as is known the difficulties in deriving useful power from this source have been such that there has been little or no commercial use of power derived from this source.

One of the principal difficulties encountered in connection with this source of power is occasioned by the fact that tidal movement at high tide and at low tide is zero and is relatively slight during the periods just prior to and just subsequent to high and low tides. Attempts have been made to store power generated during the maximum rate of tidal movement but the proposals in this regard have involved drawbacks which have impaired practical usage.

GENERAL STATEMENT OF INVENTION

It is a principal object of this invention to provide a machine for deriving power from the vertical movement of a floating body whereby power continues to be supplied to a rotatable power shaft at high tide and at low tide and during the periods shortly before and shortly after high tide and low tide, respectively. A further object of the invention is to do so on a time controlled basis that is independent of variations in tidal movement and tidal timing.

These and other objects of the invention are attained by a novel and flexible machinery arrangement which takes advantage of the power of the rise and fall of ocean tides, combined with gravity to produce mechanical power useful for various power applications such as the generation of electricity, water purification systems, conveyor systems, etc.

It is a principal feature and advantage of this invention that in addition to means for deriving power from a floating body that rises and falls with the tide there is employed in combination therewith means for storing power by the lifting of a weight responsive to rising tidal movement and releasing said power by permitting the weight to descend independently of tidal movement during the period shortly prior and shortly subsequent to high tide and shortly prior and shortly subsequent to low tide under timing control and utilizing mechanical means which supplies power to the common rotatable power shaft of the machine during the periods of time adjacent high tide and adjacent low tide. In this way a continuous supply of power is afforded notwithstanding periods of little or no tidal movement.

Features of this invention relate to the provision of means for rotatating a rotatable power shaft in the same direction responsive to either ascent or descent of a floating body in combination with a weight which is lifted during rising tide and which is permitted to descend regardless of any tidal movement during the periods adjacent high and low tides, respectively, and from which mechanical power is derived from the gravitational force of the descending body.

Other features of this invention relate to the control of the movement of the weight between an upper position and a lower position which are spaced apart vertically by the minimum tidal movement at the particular coastal location of the machine, so that power is derivable from the descent of the weight even under conditions of minimum tidal movement. Moreover, this assurance of reserve power is afforded by the machine even though the machine derives power from the ascent and descent of a floating body over vertical distances which may vary and which may be considerably greater than the aforesaid minimum tidal movement.

Other features of this invention relate to means for controlling the lifting of the weight through a predetermined distance of vertical movement notwithstanding the vertical movement of the floating body which provides the primary source of power. Preferably this is accomplished by a separate float means together with means for securing the weight so as to be lifted thereby when the weight is in the lower position and to disconnect the weight from the float means at the predetermined upper position of the weight.

Means is provided for holding the weight when it is disconnected from the float means in combination with means for releasing the weight shortly before high tide. The holding means is restored to holding position shortly after high tide and is held stationary during the descent of the primary float during its period of most rapid descending movement from shortly after high tide until shortly prior to low tide.

Shortly prior to low tide the weight is released again and power resulting from its gravitational descent is taken off and utilized until shortly after low tide when the holding means is restored to holding position for holding the weight stationary during the period of greatest rate of ascending movement of the primary floating body from shortly after low tide until shortly prior to high tide.

The means for holding and releasing the weight preferably are controlled responsive to a clock mechanism that is timed in relation to the tidal movements so as to effect the timing as previously described. Preferably the clock mechanism includes in combination therewith means for setting it responsive to tidal movement so that the release of the weight will occur at the desired predetermined period shortly prior to high tide and again at the desired predetermined period shortly prior to low tide for more effectively accomplishing the purposes aforesaid.

DETAILED DESCRIPTION OF THE INVENTION

The foregoing and other objects, features and advantages of this invention will be apparent from the following description for purposes of illustration of an exemplary embodiment of my invention, wherein:

FIG. 1 is a perspective view of a machine embodying my invention;

FIG. 2 is a side elevation of said machine;

FIG. 3 is a side elevation, partly in section, showing the gear trains and the means for holding and releasing the weight at predetermined times;

FIG. 4 is a plan view of the machine shown in FIG. 3;

FIG. 5 is a plan detail view of the means for gripping the lifting cable for lifting the weight;

FIG. 6 is an elevational detail of the mechanism shown in FIG. 5;

FIG. 7 is an end elevational detail showing the axle and sprockets for transmission of power from the primary floating body and weight to the mechanism for receiving and utilizing power; and FIG. 8 is a detail elevation of the means for automatically adjusting the clock mechanism responsive to tidal position.

The machine shown in the drawings provides an arrangement adapted to be used at dockside wherever the tidal range is between 5 and 12 feet and continuous power can be used.

In FIG. 1 the machine indicated generally by the reference character A is shown bolted to a pier or suitable supporting structure 10 so as to receive power through chains 11, 12 and 13 to its left side and right half and through chains 14, 15 and 16 to its right side and left half. When reference is made to the right side of the machine the reference is to the right side as shown and indicated in FIG. 1. The other side is the left side. The power trains within the machine which are powered from the left side are referred to as the right half of the machine while the power trains powered from the right side are referred to as the left half. Chains 11 and 12 are attached to float 17 which rises and falls with the tide. Chains 14, 15 and 16 deliver power to the right side and left half of machine A only when the weight 18 are descending. The function of float 19 is to raise weight 18 on the rising tide so that the weights 18 may descend during the slack high and low tide periods as further described below.

The gears within machine A are arranged to rotate the rotatably mounted power shaft 20 of machine A only in one direction of rotation regardless of whether float 17 is moving up or down. Chains 14, 15 and 16 deliver power to the right side and the left half of machine A to shaft 20 only when they are descending. Float 19 rises and falls with the tide without direct connection to machine A.

The relationships of the floats, chains, weights and machine A are shown in FIGS. 1 and 2. Attached to floats 17 and 19 are supports 21 and 22, respectively, on opposite sides of the I beam roller tracks 23 which hold the floats in position laterally and which through rollers 24 attached thereto adjacent the ends thereof cooperate with I beam roller tracks 23 to guide the floats vertically relative to the pier 10. The I beam roller tracks 23 are fixed in position to piling under the dock by means of supports 25.

Float 17 is the main source of power. It drives chains 11 and 12 by its buoyancy as the tide rises and by gravity as the tide falls away when its weight drives said chains in the reverse direction. In FIG. 7 the arrangement of chain sprockets on the main axle is shown. Chains 11, 12 and 13 on their respective sprockets 26, 27 and 28 are integrated into a single power train by securing the sprockets to the main axle 29 with chain 13 transferring power to sprocket 30 (FIG. 4) which is the input to the right half of machine A. Axle 29 is rotatably mounted in bearings 45 carried by brackets 46A secured to the pier 10. At their lowermost extremity of travel chains 11 and 12 pass over sprockets 46 and 47, respectively, and chains 14 and 15 pass over sprockets 48 and 49, respectively. The sprockets rotate freely about the shaft 50 which is held in secured relation to I beam roller tracks 23 by the brackets 51.

Float 19 is incidental to power supply for machine A as its main function is to hoist weight 18 through cable 31 so it may be in position to supply power to chains 14 and 15. As shown in FIG. 7, sprockets 32, 33 and 34 for chains 14, 15 and 16, respectively, are all mounted on a common hollow axle 35 surrounding the main axle 29 and thus chains 14, 15 and 16 form a continuous line of power through chain 16 to sprocket 36 which is the input to the left half of machine A.

Referring to FIG. 2 and the operation of weight 18, it should be noted that it is restricted to function always below low-water. It would be possible to arrange weights to function on a suitable structure above high-water, like on the dock, but due to the large size of the weights involved it is more practicable to keep it down and out of the way.

The weight 18 may be slabs of iron, lead or any object of sufficient weight bolted together to form cradle 37, all together attached to chains 14 and 15.

Cable 31 is used to hoist weight 18 during the rising tide by engagement of objects 38 similar to an iron ball, attached to and a part of cable 31 but the objects 38 will not pass through the V-shaped opening 39 when pulled upward by cable 31, which in turn is pulled up by float 19. Cable 31 is weighted at each end by weight 40 under float 19 and by a heavier weight 41 under the dock after passing through guide pulleys 42 and 43. At its lowermost extremity the cable 31 passes over guide pulley 52 which rotates freely on shaft 50. Because weight 18 is scheduled to be hoisted only 5 feet maximum (the range of the lowest tidal range the tide machine will encounter in continuous operation), provision must be made for greater ranges and lower tide levels and their effect on float 19 and cable 31. The short tides (5 feet) do not reach mean low-water on the down side but the longer range tides might reach 2 feet below mean low-water. Therefore, it is necessary to hold cable 31 in position for objects 38 to immediately contact and start lifting weight 18 when the shortest tide might be affecting the hoisting operation. All other tide low levels are below this shortest tide, hence weight 41 must be stopped from descending below such level by block 44 on the dock piling and in order to maintain tension on cable 31 weight 40 must be free to descend from its hoisting position under float 19. See FIG. 2.

In this manner, float 19 can range up and down with all tides but the hoisting connection to the weights 18 will not. This overcomes the problem of having the weights 18 descending after low-tide has passed an hour or more and takes advantage of an opportunity to stabilize the contact area of opening 39 and objects 38. If desired, guides or shields may be employed to assure lateral and vertical alignment.

When the upward pull of cable 31 engages objects 38 the weight 18 will be lifted until ejector 53 forces objects 38 by a horizontal push out of the V-shaped opening 39. Ejector 53 is shown in the ejecting position in FIG. 2 but its normal position is with its ejecting arm vertical to the area of cradle 37 to which it is attached by brackets 54. Adjustable screw-bolt 55 is mounted on a support 56 secured to the I beam roller tracks 23 and is aimed at the contact arm of ejector 53. After ejection, float 19 continues upward. Weight 18 would immediately descend except for the fact that the chains 11, 12 and 13 are locked for preventing the weight 18 from descending until released within the left half of machine A.

Referring to FIG. 4, the left half and right half of machine A are similar but the right half will drive the output power shaft 20 with power applied by chain 13 from either direction, clockwise or counter-clockwise, but in the left half counter-clockwise power alone will drive output power shaft 20.

In the right half power is delivered during rising tide by chain 13 through sprocket 30 which is rotating in clockwise direction axle 57, gears 58 and 59 and axle 60; from axle 60 it is the rising tide power which flows through gears 67, 68, axle 69, one-way bearing 70, gears 71, 72 (on axle 74) and gear 73 to shaft 20. The power applied on axle 60 also turns gears 61, 62 and axle 63, but one-way clutch 64 coasts in this direction and no power is transmitted to gear 65. Actually gear 65 is turning in the opposite direction because all gears meshed with any of the gears on shaft 20 are in motion.

On the falling tide the rotation of sprocket 30 is counter-clockwise and axles 57, 60, 63 and 69 are turning in the opposite direction to that which occurs during the rising tide. Therefore, gears 61, 62 and axle 63 drive power through one-way clutch 64, gear 65 and gear 66 on shaft 20, the one-way clutch 70 now coasting and gear 71 not being affected by the direction in which axle 69 is now turning.

On the left half of machine A it is to be noted that all gears are arranged for effective use when weight 18 is descending. Any upward motion of weight 18 turns gears so that one-way clutches 118 and 119 will coast and no motion is transmitted beyond them. Therefore, attention is directed to the downward force of weight 18 which exert counter-clockwise power at sprocket 36. The power flows through sprocket 36, axle 75, gears 76 and 77, axle 78, gears 79 and 80, axle 81, one-way clutch 119, gears 82 and 83 to shaft 20. Power also flows through gear 84, axle 85, one-way clutch 118 and gear 86. Whether gear 86 will allow this power to flow to shaft 20 or whether it is locked (immobile) is controlled by tripping trigger 87 (under pressure from spring 88 attached to frame) which in turn, through axle 89, is controlled by arm 90. Therefore, if gear 86 is not allowed to move, the whole left half of the machine is immobilized and the weight 18 cannot descend. At this point care is always taken to be sure enough gear reduction exists in this line of gears to adequately hold the weight of weight 18.

In order to have continuous power at shaft 20, the weight 18 is scheduled by a tidal time clock to be released for descending and supplying power to shaft 20 during slack water at high tide and low tide approximately 1 hour before and after each change of tide. This releasing of the weight 18 is accomplished through arm 90 being raised by the high spots on the cam-like rim of the face on a 24-hour mechanical clock, which raising and lowering raises or lowers tripping trigger 87. Arm 91 and stud 92 on the left end of arm 90 are fine adjustments to ensure positive action on trigger 87.

The clock face 93 is rotated by a mechanical device or electric motor, shown behind the face as 94, once every 24 hours (four tides). Its face is on a ratchet so that the face may be pushed ahead if it is running slow. The "high points" or cams 110 on the rim of the clockface are arranged to raise arm 90 (releasing trigger 87) approximately 1 hour ahead of the next change in tide and to lower arm 90 approximately 1 hour after the change in tide has occurred; in this manner the weight 18 and machinery on the left half of machine A are permitted to run approximately 2 hours and then are stopped until the next time arm 90 is raised, i.e., 4 hours (1 hours before the next change in tide). This cycle is continuous but on the rising tide interval of four hours weight 18 must be raised sufficiently to descend 4 hours before being raised again. The rate of descent of the weight 18 may be controlled in any desired manner so that during the period in the region of high tide when arm 90 is elevated to the position at which the weight is released the weight will descend about midway of their total vertical travel and then be stopped by the lowering of the arm 90. In the embodiment shown this is accomplished by braking governor 120 which applies braking pressure to the rotated shaft 121 by braking members 112 responsive to speed of rotation of the balls 113 whose position is responsive to centrifugal force. The governor is operated from gear 86 through small gear 114, axle 115, and large gear 116 which causes rotation of the shaft through worm or other suitable drive 117. Since the gear is on a one-way clutch, the governor will be rotated only during descent of the weight and there is no reversing problem. When the arm 90 is again raised as ebb tide is approached the arm 90 is raised again and the rate of descent of the weight is controlled by the governor so that the descent of the weight will be completed during the time period that the arm 90 is raised in the zone of ebb tide.

Because all tides are not exactly 6 hours in duration the clock must be "set" each time a tide has changed direction. In FIGS. 3 and 4 axle 60 is shown as coming through the machine A and turning gear 95 which, in turn, turns gear 96 and turns its axle 97. Thus, there are two axles 60 and 97 rotating in opposite directions but rotating only when the tide is rising or falling as controlled by float 17 and its line of power to axle 60. However, on successive tides the direction of rotation alternates so that at each change of tide one or the other axle will start turning counter-clockwise, and at that point of time the clock face may be set to a position whereby the next high point on its rim will raise arm 90 in approximately 4 hours. This "adjustment" to the clock face is made by contact between teeth 98 presented by belts 99 and 100 and studs protruding out at 90° from the clock face, studs 101 and 102 pointing outward away from the machine and studs 103 and 104 pointing inward toward the machine. In this manner, as shown in FIG. 3, one of the outward pointing studs 101 or 102 will be in contact with a tooth on belt 99 moving from right to left on the rising tide at its first sign of motion upwards. The studs are set so that teeth on the belt will push the stud up and out of contact with the tooth 98 as the rising tide moves the belt. The duration of the previous tide will determine where the stud actually is with relation to the belt as the clock runs uniformly. The setting of the studs on the clock face is important. The belt 99 is actuated by pulley 105 fixed to axle 60 and at its remote end passes over idling pulley 106 rotatably mounted on axle 107. It is brought into alignment by idlers 97A. Belt 100 is actuated by pulley 108 fixed to axle 97 and its remote end passes over pulley 109 rotatably mounted on axle 107.

When the tide and clock have run approximately 6 hours and the tide turns down, the other belt 100 and stud 103 or 104 will perform the same as just described above, the stud 103 or 104 pointing inward and belt 100 moving from right to left. The fact that belt 99 will be moving from left to right will not interfere as no stud on that side of the clock face is in position to do so. In this manner successive tides affect the appropriate stud on the clock face. The letters LT and HT on the clock face indicate low tide and high tide. The drawing in FIG. 3 shows that the rising tide is starting and the weight 18 is descending because arm 90 has been lifted up by the action of the cam 110 with the cam follower 111 rotatably mounted at the end of arm 90 and has released the weight 18 over an hour ago.

The relationship of the movement of weight 18 and its availability to descend an hour or more before high tide and to descend past low tide an hour or later means the timing of the hoisting of the weight 18 by float 19 is critical and for this reason the placing of the objects 38 on chain 31 must provide adequate hoisting time on the shorter range tides.

The extent of the outermost surface of each of the cams 110 is such that the arm 90 will be in lifted position during a period of about 2 hours before the arm 90 is permitted to retract under the influence of the spring 88. During this period the weight will have descended through about half of the extent through which the weight 18 is lifted by the float 19 and during this period power is supplied to the shaft 20 to maintain its operation during the period of little tidal movement in the region of the tide crest. By the time the weight 18 has been locked from further descent, the descent of the float 17 has become sufficient to power the shaft 20 while the weight remain stationary. Similarly, as the ebb tide is approached one of the cams 110 lifts the arm 90 to release the weight 18 and maintains it in lifted position for another period of about 2 hours during which the weight complete its descent so that power is supplied to the shaft 20 during the period of little tidal movement in the region of ebb tide. By the time the weight has been locked against further descent the tidal movement has been restored so that shaft 20 is powered by the ascent of float 17. At the same time the rising tide lifts the weight 18 and releases it at its uppermost position at a time when it is locked against descent.

It is to be understood that the foregoing has been described for purposes of illustration and that variations in the exemplary embodiment may be made as regards the type of floats, type and location of weights, gear ratios, the range of movement of the floats and weights and the timing as may be desired. In fact, it is one of the advantages of this invention that it can be readily accommodated to different tidal conditions in different locations and the amount of power to be derived.

I claim:

1. In apparatus for powering a rotatable power shaft wherein there is utilization of the tidal movement of a floating body, the improvement which comprises in combination a floating body, a support, guide means which guides said floating body for substantially vertical movement relative to said support in proximate relation thereto, means carried by said support for rotatably mounting said power shaft, means for rotating said power shaft in a given direction responsive to ascending movement of said floating body, means for rotating said power shaft in the same direction responsive to descending movement of said floating body, a weight, guide means which guides said weight for substantially vertical movement relative to said support in proximate relation thereto, float means, means for lifting said weight from a lower position to an upper position responsive to rising tidal movement of said float means, means for rotating said power shaft in said same direction responsive to descent of said weight, and means which effects descent of said weight from said upper position to an intermediate position so as to commence and terminate during the period of tidal movement adjacent high tide, means for holding said weight at said intermediate position and means which effects descent of said weight from said intermediate position to said lower position so as to commence and terminate during the period of tidal movement adjacent low tide.

2. Apparatus according to claim 1 which comprises a cable, securing means which secures one end of said cable to said float means, means for securing said cable to said weight when said weight is in said lower position so as to lift said weight during rising tidal movement of said float means, means for disconnecting said weight from said cable when said weight has been lifted to said upper position, and holding means for holding said weight in substantially stationary position upon said weight being disconnected from said cable.

3. Apparatus according to claim 1 which comprises holding means for holding said weight against descent when it is in said upper position, means for releasing said holding means so as to permit descent of said weight at a point in tidal movement adjacent and prior to high tide, means for restoring said holding means to holding position at a point in tidal movement adjacent and subsequent to high tide, means for releasing said holding means so as to permit descent of said weight at the next succeeding point in tidal movement prior to and adjacent low tide and means for restoring said holding means to holding position at a point in tidal movement adjacent and subsequent to low tide.

4. Apparatus according to claim 1 which comprises means for securing said weight to said float means when said weight is in said lower position so as to be lifted by said float means responsive to rising tide, means for disconnecting said weight from said float means when said weight attains said upper position, means for holding said weight against descent when said weight is disconnected from said float means, a clock mechanism, means responsive to said clock mechanism for releasing said weight to permit its descent, for restoring said holding means to holding position, for releasing said holding means again and for restoring said holding means to holding position so that descent of said weight is permitted for a substantial period of time preceding and following high tide and again for a substantial period of time preceding and following low tide.

5. Apparatus according to claim 4 which comprises means responsive to tidal movement for regulating said clock mechanism for releasing said holding means at a predetermined time interval prior to high tide and at a predetermined interval prior to low tide.

6. Apparatus according to claim 1 which comprises means for adjusting said upper and lower positions of said weight so as to be not more than the minimum tidal movement at the place of installation irrespective of greater tidal movement of said floating body and of said float means.

* * * * *